United States Patent
Wehrs

(10) Patent No.: US 6,615,149 B1
(45) Date of Patent: Sep. 2, 2003

(54) SPECTRAL DIAGNOSTICS IN A MAGNETIC FLOW METER

(75) Inventor: David L. Wehrs, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/576,450

(22) Filed: May 23, 2000

Related U.S. Application Data

(63) Continuation-in-part of application No. 09/209,134, filed on Dec. 10, 1998.

(51) Int. Cl.[7] .............................................. G01R 23/18
(52) U.S. Cl. ..................................... 702/76; 73/861.11
(58) Field of Search .............................. 702/76, 12, 17, 702/35, 38, 45, 70, 75, 77, 79, 100; 73/861.11–861.17

(56) References Cited

U.S. PATENT DOCUMENTS

| | | | |
|---|---|---|---|
| 3,096,434 A | 7/1963 | King ........................... 235/151 |
| 3,404,264 A | 10/1968 | Kugler ........................ 235/194 |
| 3,468,164 A | 9/1969 | Sutherland .................... 73/343 |
| 3,590,370 A | 6/1971 | Fleischer ...................... 324/51 |
| 3,688,190 A | 8/1972 | Blum ........................ 324/61 R |
| 3,691,842 A | 9/1972 | Akeley ....................... 73/398 C |
| 3,701,280 A | 10/1972 | Stroman ....................... 73/194 |
| 3,855,858 A | 12/1974 | Cushing ................. 73/194 EM |
| 3,973,184 A | 8/1976 | Raber ........................... 324/51 |
| RE29,383 E | 9/1977 | Gallatin et al. ................ 137/14 |

(List continued on next page.)

FOREIGN PATENT DOCUMENTS

| | | |
|---|---|---|
| DE | 35 40 204 C1 | 9/1986 |
| DE | 40 08 560 A1 | 9/1990 |
| DE | 44 33 593 A1 | 6/1995 |
| DE | 195 02 499 A1 | 8/1996 |
| DE | 19930660 A1 | 7/1999 |
| DE | 299 17 651 U1 | 12/2000 |
| EP | 0 122 622 A1 | 10/1984 |
| EP | 0 413 814 A1 | 2/1991 |
| EP | 0 487 419 A2 | 5/1992 |
| EP | 0 512 794 A2 | 11/1992 |

(List continued on next page.)

OTHER PUBLICATIONS

"On–Line Tool Condition Monitoring System with Wavelet Fuzzy Neural Network," by Li Xiaoli et al., pp. 271–276 (1997).

"Optimal Design of the Coils of an Electromagnetic Flow Meter," Andrzej Michalski et al., IEEE Transactions on Magnetics, vol. 34, Issue 5, Part 1, pp. 2563–2566 (1998).

"Magnetic Fluid Flow Meter for Gases," Nicolae Calin Popa et al., IEEE Transactions on Magnetics, vol. 30, Issue 2, Part 1–2, pp. 936–938 (1993).

"New Approach to a Main Error Estimation for Primary Transducer of Electromagnetic Flow Meter," Andrzej Michalski, IEEE Instrumentation and Measurement Technology Conference, vol. 2, pp. 1093–1097 (May 1998).

(List continued on next page.)

*Primary Examiner*—Marc S. Hoff
*Assistant Examiner*—Edward Raymond
(74) *Attorney, Agent, or Firm*—Westman, Champlin & Kelly, P.A.

(57) ABSTRACT

A magnetic flow transmitter provides a coil driver output at a selected fundamental to a coil on a flow tube carrying a flow of a liquid. An amplifier amplifies an electrode signal from the flow tube and an A/D converter converts the amplified electrode signal. A digital signal processor (DSP) uses a spectral transform such as a Fourier type transform to generate a flow output based on spectral components at or near the fundamental and a noise diagnosing output based on components at or near a noise frequency.

20 Claims, 6 Drawing Sheets

U.S. PATENT DOCUMENTS

| | | | |
|---|---|---|---|
| 4,058,975 A | 11/1977 | Gilbert et al. | 60/39.28 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,249,164 A | 2/1981 | Tivy | 340/870.3 |
| 4,250,490 A | 2/1981 | Dahlke | 340/870.37 |
| 4,337,516 A | 6/1982 | Murphy et al. | 364/551 |
| 4,399,824 A | 8/1983 | Davidson | 128/736 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,571,689 A | 2/1986 | Hildebrand et al. | 364/481 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,707,796 A | 11/1987 | Calabro et al. | 364/552 |
| 4,720,806 A | 1/1988 | Schippers et al. | 364/551 |
| 4,736,763 A | 4/1988 | Britton et al. | 137/10 |
| 4,736,367 A | 5/1988 | Wroblewski et al. | 370/85 |
| 4,777,585 A | 10/1988 | Kokawa et al. | 364/164 |
| 4,807,151 A | 2/1989 | Citron | 364/510 |
| 4,831,564 A | 5/1989 | Suga | 364/551.01 |
| 4,841,286 A | 6/1989 | Kummer | 340/653 |
| 4,873,655 A | 10/1989 | Kondraske | 364/553 |
| 4,907,167 A | 3/1990 | Skeirik | 364/500 |
| 4,924,418 A | 5/1990 | Backman et al. | 364/550 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,043,862 A | 8/1991 | Takahashi et al. | 364/162 |
| 5,053,815 A | 10/1991 | Wendell | 355/208 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCulloch et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | * 11/1994 | Hernandez et al. | 324/207.25 |
| 5,367,612 A | 11/1994 | Bozich et al. | 395/22 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Skeirik | 364/163 |
| 5,408,586 A | 4/1995 | Mathur et al. | 395/23 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogura | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,510,779 A | 4/1996 | Maltby et al. | 340/870.3 |
| 5,511,004 A | 4/1996 | Dubost et al. | 364/551.01 |
| 5,495,769 A | 5/1996 | Borden et al. | 73/718 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,560,246 A | 10/1996 | Bottinger et al. | 73/861.15 |
| 5,561,599 A | 10/1996 | Lu | 364/164 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,578,763 A | 11/1996 | Spencer et al. | 73/861.08 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,623,605 A | 4/1997 | Keshav et al. | 395/200.17 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |
| 5,644,240 A | 7/1997 | Brugger | 324/439 |
| 5,661,668 A | 8/1997 | Yemini et al. | 364/550 |
| 5,665,899 A | 9/1997 | Willcox | 73/1.63 |
| 5,669,713 A | 9/1997 | Schwartz et al. | 374/1 |
| 5,671,335 A | 9/1997 | Davis et al. | 395/23 |
| 5,675,504 A | 10/1997 | Serodes et al. | 364/496 |
| 5,675,724 A | 10/1997 | Beal et al. | 395/182.02 |
| 5,680,109 A | 10/1997 | Lowe et al. | 340/608 |
| 5,700,090 A | 12/1997 | Eryurek | 374/210 |
| 5,703,575 A | 12/1997 | Kirpatrick | 340/870.17 |
| 5,704,011 A | 12/1997 | Hansen et al. | 395/22 |
| 5,705,978 A | 1/1998 | Frick et al. | 340/511 |
| 5,708,211 A | 1/1998 | Jepson et al. | 73/861.04 |

| | | | |
|---|---|---|---|
| 5,708,585 A | 1/1998 | Kushion | 364/431.061 |
| 5,710,370 A | 1/1998 | Shanahan et al. | 73/1.35 |
| 5,713,668 A | 2/1998 | Lunghofer et al. | 374/179 |
| 5,719,378 A | 2/1998 | Jackson, Jr. et al. | 219/497 |
| 5,736,649 A | 4/1998 | Kawasaki et al. | 73/861.23 |
| 5,741,074 A | 4/1998 | Wang et al. | 374/185 |
| 5,742,845 A | 4/1998 | Wagner | 395/831 |
| 5,746,511 A | 5/1998 | Eryurek et al. | 374/2 |
| 5,747,701 A | 5/1998 | Marsh et al. | 73/861.23 |
| 5,752,008 A | 5/1998 | Bowling | 395/500 |
| 5,764,891 A | 6/1998 | Warrior | 395/200.2 |
| 5,781,878 A | 7/1998 | Mizoguchi et al. | 701/109 |
| 5,801,689 A | 9/1998 | Huntsman | 345/329 |
| 5,805,442 A | 9/1998 | Crater et al. | 364/138 |
| 5,817,950 A | 10/1998 | Wiklund et al. | 73/861.66 |
| 5,828,567 A | 10/1998 | Eryurek et al. | 700/79 |
| 5,829,876 A | 11/1998 | Schwartz et al. | 374/1 |
| 5,848,383 A | 12/1998 | Yuuns | 702/102 |
| 5,859,964 A | 1/1999 | Wang et al. | 395/185.01 |
| 5,876,122 A | 3/1999 | Eryurek | 374/183 |
| 5,880,376 A | 3/1999 | Sai et al. | 73/861.08 |
| 5,887,978 A | 3/1999 | Lunghofer et al. | 374/179 |
| 5,908,990 A | 6/1999 | Cummings | 73/861.22 |
| 5,923,557 A | 7/1999 | Eidson | 364/471.03 |
| 5,924,086 A | 7/1999 | Mathur et al. | 706/25 |
| 5,926,778 A | 7/1999 | Pöppel | 702/130 |
| 5,940,290 A | 8/1999 | Dixon | 364/138 |
| 5,956,663 A | 9/1999 | Eryurek et al. | 702/183 |
| 5,970,430 A | 10/1999 | Burns et al. | 702/122 |
| 6,014,902 A | 1/2000 | Lewis et al. | 73/861.12 |
| 6,016,523 A | 1/2000 | Zimmerman et al. | 710/63 |
| 6,016,706 A | 1/2000 | Yamamoto et al. | 9/6 |
| 6,017,143 A | 1/2000 | Eryurek et al. | 700/51 |
| 6,038,579 A | 3/2000 | Sekine | 708/400 |
| 6,045,260 A | 4/2000 | Schwartz et al. | 374/183 |
| 6,047,220 A | 4/2000 | Eryurek et al. | 700/28 |
| 6,047,222 A | 4/2000 | Burns et al. | 700/79 |
| 6,052,655 A | 4/2000 | Kobayashi et al. | 702/184 |
| 6,119,047 A | 9/2000 | Eryurek et al. | 700/28 |
| 6,119,529 A | 9/2000 | Di Marco et al. | 73/861.68 |
| 6,151,560 A | 11/2000 | Jones | 702/58 |
| 6,192,281 B1 | 2/2001 | Brown et al. | 700/2 |
| 6,195,591 B1 | 2/2001 | Nixon et al. | 700/83 |
| 6,199,018 B1 | 3/2001 | Quist et al. | 702/34 |
| 6,236,948 B1 | 4/2001 | Eck et al. | 702/45 |
| 6,237,424 B1 | 5/2001 | Salmasi et al. | 73/861.17 |
| 6,263,487 B1 | 7/2001 | Stripf et al. | 717/1 |
| 6,298,377 B1 | 10/2001 | Hartikainen et al. | 709/223 |
| 6,311,136 B1 | 10/2001 | Henry et al. | 702/45 |
| 6,327,914 B1 | 12/2001 | Dutton | 73/861.356 |

FOREIGN PATENT DOCUMENTS

| | | |
|---|---|---|
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1058093 A1 | 5/1999 |
| FR | 2 334 827 | 7/1977 |
| GB | 928704 | 6/1963 |
| GB | 1 534 280 | 11/1978 |
| GB | 2 310 346 A | 8/1997 |
| JP | 58-129316 | 8/1983 |
| JP | 59-116811 | 7/1984 |
| JP | 59163520 | 9/1984 |
| JP | 59-211196 | 11/1984 |
| JP | 59-211896 | 11/1984 |
| JP | 60-507 | 1/1985 |
| JP | 60-76619 | 5/1985 |
| JP | 60-131495 | 7/1985 |
| JP | 60174915 | 9/1985 |
| JP | 62-30915 | 2/1987 |
| JP | 64-1914 | 1/1989 |
| JP | 64-72699 | 3/1989 |
| JP | 2-5105 | 1/1990 |
| JP | 03229124 | 10/1991 |
| JP | 5-122768 | 5/1993 |
| JP | 06242192 | 9/1994 |
| JP | 7-63586 | 3/1995 |
| JP | 07234988 | 9/1995 |
| JP | 8-54923 | 2/1996 |
| JP | 8-136386 | 5/1996 |
| JP | 8-166309 | 6/1996 |
| JP | 08247076 | 9/1996 |
| JP | 2712625 | 10/1997 |
| JP | 2712701 | 10/1997 |
| JP | 07225530 | 5/1998 |
| JP | 10-232170 | 9/1998 |
| JP | 11083575 | 3/1999 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/20469 | 5/1998 |
| WO | WO 00/70531 | 11/2000 |

OTHER PUBLICATIONS

"Additional Information From Flowmeters Via Signal Analysis," J.E. Amadi–Echendu et al., IEEE Instrumentation and Measurement Technology Conference Record, vol. 7, pp. 187–193 (1990).

U.S. patent application Ser. No. 09,852,102, Eryurek et al., filed May 2001.

"Microsoft Press Computer Dictionary" 2nd Edition, 1994, Microsoft Press. p. 156.

U.S. patent application Ser. No. 09/855,179 Eryurek et al., filed May 2001.

"Improving Dynamic Performance of Temperature Sensors with Fuzzy Control Techniques," by Wang Lei et al., pp. 872–873 (1992).

"Ein Modulares, verteiltes Diagnose–Expertensystem für die Fehlerdiagnose in lokalen Netzen," by Jürgen M. Schröder, pp. 557–565 (1990).

"Fault Diagnosis of Fieldbus Systems," by Jürgen Quade, pp. 577–581 (Oct. 1992).

"Ziele und Anwendungen von Feldbussystemen," by T. Pfeifer et al., pp. 549–557 (Oct. 1987).

"PROFIBUS–Infrastrukturmaβnahmen," by Tilo Pfeifer et al., pp. 416–419 (Aug. 1991).

"Simulation des Zeitverhaltens von Feldbussystemen," by O. Schnelle, pp. 440–442 (1991).

"Modélisation et simulation d'un bus de terrian: FIP," by Song et al, pp. 5–9 (undated).

"Feldbusnetz für Automatisierungssysteme mit intelligenten Funktionseinheiten," by W. Kriesel et al., pp. 486–489 (1987).

"Bus de campo para la inteconexión del proceso con sistemas digitales de control," Tecnologia, pp. 141–147 (1990).

"Dezentrale Installation mit Echtzeit–Feldbus," Netzwerke, J. Nr.3 v. 14.3, 4 pages (1990).

"Process Measurement and Analysis," by Liptak et al., Instrument Engineers' Handbook, Third Edition, pp. 528–530, (1995).

"A Microcomputer–Based Instrument for Applications in Platinum Resistance Thermomety," by H. Rosemary Taylor and Hector A. Navarro, Journal of Physics E. Scientific Instrument, vol. 16, No. 11, pp. 1100–1104 (1983).

"Experience in Using Estelle for the Specification and Verification of a Fieldbus Protocol: FIP," by Barretto et al., Computer Networking, pp. 295–304 (1990).

"Computer Simulation of H1 Field Bus Transmission, "by Utsumi et al., Advances in Instrumentation and control, vol. 46, part 2, pp. 1815–1827 (1991).

"Progress in Fieldbus Developments for Measuring and control Application," by A. Schwaier, Sensor and Acuators, pp. 115–119 (1991).

"Ein Emulationssystem zur Leistungsanalyse von Feldbussystemen, Teil 1," by R. Hoyer, pp. 335–336 (1991).

"Simulatore Integrato: Controllo su bus di campo, " by Barabino et al., Automazione e Strumentazione, pp. 85–91 (Oct. 1993).

U.S. paten application Ser. No. 09/576,719 Coursolle et al., Coursolle et al., filed May 23, 2000.

U.S. paten application Ser. No. 09/799,824 Rome et al., filed Mar. 5, 2001.

U.S. patent application Ser. No. 09/169,873, Eryurek et al., filed Oct. 12, 1998.

U.S. patent application Ser. No. 09/175,832, Eryurek et al., filed Oct. 19, 1998.

U.S. patent application Ser. No. 09/257,896, Eryurek et al., filed Feb. 25, 1999.

U.S. patent application Ser. No. 09/303,869, Eryurek et al., filed May 3, 1999.

U.S. patent application Ser. No. 09/335,212, Kirkpatrick et al., filed Jun. 17, 1999.

U.S. patent application Ser. No. 09/344,631, Eryurek et al., filed Jun. 25, 1999.

U.S. patent application Ser. No. 09/360,473, Eryurek et al., filed Jul. 23, 1999.

U.S. patent application Ser. No. 09/369,530, Eryurek et al., filed Aug. 6, 1999.

U.S. patent application Ser. No. 09/383,828, Eryurek et al., filed Aug. 27, 1999.

U.S. patent application Ser. No. 09/384,876, Eryurek et al., filed Aug. 27, 1999.

U.S. patent application Ser. No. 09/406,263, Kirkpatrick et al., filed Sep. 24, 1999.

U.S. patent application Ser. No. 09/409,098, Eryurek et al., filed Sep. 30, 1999.

U.S. patent application Ser. No. 09/409,114, Eryurek et al., filed Sep. 30, 1999.

U.S. patent application Ser. No. 09/565,604, Eruyrek et al., filed May 4, 2000.

U.S. patent application Ser. No. 09/606,259, Eryurek, filed Jun. 29, 2000.

U.S. patent application Ser. No. 09/616,118, Eryurek et al., filed Jul. 14, 2000.

U.S. patent application Ser. No. 09/627,543, Eryurek et al., filed Jul. 28, 2000.

"A TCP/IP Tutorial" by, Socolofsky et al., Spider Systems Limited, January 1991 pp. 1–23.

"Approval Standards for Explosionproof Electrical Equipment General Requirements", Factory Mutual Research, Cl. No. 3615, Mar. 1989, pp. 1–34.

"Approval Standard Intrinsically Safe Apparatus and Associated Apparatus for Use in Class I, II, and III, Division 1 Hazardous (Classified) Locations", Factory Mutual Research, Cl. No. 3610, October 1988, pp. 1–70.

"Automation On–line" by, Phillips et al., Plant Services, Jul. 1997, pp. 41–45.

"Climb to New Heights by Controlling your PLCs Over the Internet" by, Phillips et al., Intech, Aug. 1998, pp. 50–51.

"CompProcessor for Piezoresistive Sensors" MCA Technologies Inc. (MCA7707), pp. 1–8.

"Ethernet emerges as viable, inexpensive fieldbus", Paul G. Schreier, Personal Engineering, Dec. 1997, pp. 23–29.

"Ethernet Rules Closed–loop System" by, Eidson et al., Intech, Jun. 1998, pp. 39–42.

"Fieldbus Standard for Use in Industrial Control Systems Part 2: Physical Layer Specification and Service Definition", ISA –S50. Feb. 1992, pp. 1–93.

"Fieldbus Standard for Use in Industrial Control Systems Part 3: Data Link Service Definition", ISA–S50. Feb.1997, Part 3, Aug. 1997, pp. 1–159.

"Fieldbus Standard for Use in Industrial Control Systems Part 4: Data Link Protocol Specification", ISA–S50. Feb. 1997, Part 4, Aug. 1997, pp. 1–148.

"Fieldbus Support for Process Analysis" by, Blevins et al., Fisher–Rosemount Systems, Inc., pp. 121–128.

"Fieldbus Technical Overview Understanding FOUNDATION™ fieldbus technology", Fisher–Rosemount, 1998, pp. 1–23.

"Hypertext Transfer Protocol —HTTP/1.0" by, Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internet Technology Adoption into Automation" by, Fondl et al., Automation Business, pp. 1–5.

"Internet Protocol Darpa Internet Program Protocol Specification" by, Information Sciences Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, Computer Science Facilities Group, Rutgers University, Oct. 3, 1988, pp. 1–97.

"Is There a Future for Ethernet in Industrial Control?", Miclot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Devices with the Web" by, Howard et al., Byte, Sep. 1997, pp. 45–64.

"Modular Microkernel Links GUI and Browser for Embedded Web Devices" by, Tom Williams, pp. 1–2.

"PC Software Gets its Edge From Windows, Components, and the Internet", Wayne Labs, I&CS, Mar. 1997, pp. 23–32.

Proceedings Sensor Expo, Aneheim, California, Produced by Expocon Managemnet Associates, Inc., Apr. 1996, pp. 9–21.

Proceedings Sensor Expo, Boston, Massachuttes, Produced by Expocon Management Associates, Inc., May 1997, pp. 1–416.

"Smart Sensor Network of the Future" by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–78.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *COMMUN. STATIS. –SIMULA.*, 1995, pp. 409–437.

"A Knowledge–Based Approach for Detection and Diagnosis of Out–Of–Control Events in Manufacturing Processes," by P. Love et al., *IEEE*, 1989, pp. 736–741.

"Advanced Engine Diagnostics Using Universal Process Modeling", by P. O'Sullivan, Presented at the 1996 SAE Conference on Future Transportation Technology, pp. 1–9.

Parallel, Fault–Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339–1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Signal Processing, Data Handling and Communications: The Case for Measurement Validation", by M.P. Henry, *Department of Engineering Science*, Oxford University.

"Smart Temperature Measurement in the 90s", by T. Kerlin et al., *C&I*, (1990).

"Software–Based Fault–Tolerant Control Design for Improved Power Plant Operation," IEEE/IFAC Joint Symposium on Computer–Aided Control System Design, Mar. 7–9, 1994 pp. 585–590.

A Standard Interface for Self–Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artifical Neural Networks to Identify Nuclear Power Plant States," by Israel E. Alguindigue et al., pp. 1–4.

"Application of Neural Computing Paradigms for Signal Validation,", by B.R. Upadhyaya et al., *Department of Nuclear Engineering*, pp. 1–18.

"Application of Neural Networks for Sensor Validation and Plant Monitoring," by B. Upadhyaya et al., *Nuclear Technology*, vol. 97, No. 2, Feb. 1992, pp. 170–176.

"Automated Generation of Nonlinear System Characterization for Sensor Failure Detection," by B.R. Upadhyaya et al., *ISA*, 1989 pp. 269–274.

"In Situ Calibration of Nuclear Plant Platinum Resistance Thermometers Using Johnson Noise Methods," *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a Resistance Thermometer for Use Up to 1600°C.", by M.J. de Groot et al., *CAL LAB*; Jul./Aug. 1996, pp. 38–41.

"Survey, Applications, and Prospects of Johnson Noise Thermometry," by T. Blalock et al., *Electrical Engineering Department*, 1981 pp. 2–11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249–1259.

"Field–based Architecture is Based on Open Systems, Improves Plant Performance", by P. Cleaveland, *I&CS*, Aug. 1996, pp.73–74.

"Tuned–Circuit Dual–Mode Johnson Noise Thermometers," by R.L. Shepard et al., Apr. 1992.

"Tuned–Circuit Johnson Noise Thermometry," by Michael Roberts at al., $7^{th}$ *Symposium on Space Nuclear Power Systems*, Jan. 1990.

"Smart Field Devices Provide New Process Data, Increase System Flexibility," by Mark Boland, *I&CS*, Nov. 1994, pp. 45–51.

"Wavelet Analysis of Vibration, Part I: Theory$^1$," by D.E. Newland, *Journal of Vibration and Acoustics*, vol, 116, Oct. 1994, pp. 409–416.

"Wavelet Analysis of Vibration, Part 2: Wavelet Maps," by D.E. Newland, *Journal of Vibration and Acoustics*, vol. 116, Oct. 1994, pp. 417–425.

"Development of a Long–Life, High Reliability Remotely Operated Johnson Noise Thermometer," by R.L. Shepard et al., *ISA*, 1991, pp. 77–84.

"Application of Johnson Noise Thermometry to Space Nuclear Reactors," by M.J. Roberts et al., *Presented at the 6th Symposium on Space Nuclear Power Systems*, Jan. 9–12, 1989.

"A Decade of Progress in High Temperature Johnson Noise Thermometry," by T.V. Blalock et al., *American Institute of Physics*, 1982 pp. 1219–1223.

"Sensor and Device Diagnostics for Predictive and Proactive Maintenance", by B. Boynton, *A Paper Presented at the Electric Power Research Institute –Fossil Plant Maintenance Conference* in Baltimore, Maryland, Jul. 29–Aug. 1, 1996, pp. 50–51 –50–56.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–1314.

"Detecting Blockage in Process Connections of Differential Pressure Transmitters", by E. Taya et al., *SICE*, 1995, pp. 1605–1608.

"Development and Application of Neural Network Algorithms for Process Diagnostics," by B.R. Upadhyaya et al., *Proceedings of the 29th Conference on Decision and Control*, 1990, pp. 3277–3282.

"A Fault–Tolerant Interface for Self–Validating Sensors", by M.P. Henry, *Colloquium*, pp. 3/1–3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68–88.

"Keynote Paper: Hardware Compilation–A New Technique for Rapid Prototyping of Digital Systems–Applied to Sensor Validation", by M.P. Henry, *Control Eng. Practice*, vol. 3, No. 7, pp. 907–924, (1995).

"The Implications of Digital Communications on Sensor Validation", by M. Henry et al., *Report No. QUEL 1912/92*, (1992).

"In Situ Response Time Testing of Thermocouples", ISA, by H.M. Hashemian et al., Paper No. 89–0056, pp. 587–593, (1989).

"An Integrated Architecture for Signal Validation in Power Plants," by B.R. Upadhyaya et al., *Third IEEE International Symposium on Intelligent Control*, Aug. 24–26, 1988, pp. 1–6.

"Integration of Multiple Signal Validation Modules for Sensor Monitoring," by B. Upadhyaya et al., Department of Nuclear Engineering, Jul. 8, 1990, pp. 1–6.

"Intelligent Behaviour for Self–Validating Sensors", by M.P. Henry, *Advances In Measurement*, pp. 1–7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284–L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244–246.

"Neural Networks for Sensor Validation and Plant Monitoring," by B. Upadhyaya, *International Fast Reactor Safety Meeting*, Aug. 12–16, 1990, pp. 2–10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151–162.

"Thermocouple Continuity Checker," IBM Technical Disclosure Bulletin, vol. 20, No. 5, p. 1954 (Oct. 1977).

"A Self–Validating Thermocouple," Janice C–Y et al., IEEE Transactions on Control Systems Technology, vol. 5, No. 2, pp. 239–253 (Mar. 1997).

*Instrument Engineers' Handbook*, Chapter IV entitled "Temperature Measurements," by T.J. Claggett, pp. 266–333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, Rosemount Inc. (1997).

Warrior, J., "The Collision Between the Web and Plant Floor Automation," $6^{Th}$. WWW Conference Workshop on Embedded Web Technology, Santa Clara, CA (Apr. 7, 1997).

Microsoft Press Computer Dictionary, $3^{rd}$ Edition, p. 124.

"Internal Statistical Quality Control for Quality Monitoring Instruments", by P. Girling et al., *ISA*, 15 pgs., 1999.

Web Pages from www.triant.com (3 pages).

"Statistical Process Control (Practice Guide Series Book)", *Instrument Society of America*, 1995, pp. 1–58 and 169–204.

"Time–Frequency Analysis of Transient Pressure Signals for a Mechanical Heart Valve Cavitation Study," *ASAIO Journal*, by Alex A. Yu et al., vol. 44, No. 5, pp. M475–M479, (Sep.–Oct. 1998).

"Transient Pressure Signals in Mechanical Heart Valve Caviation," by Z.J. Wu et al., pp. M555–M561 (undated).

"Caviation in Pumps, Pipes and Valves," *Process Engineering*, by Dr. Ronald Young, pp. 47 and 49 (Jan. 1990).

"Quantification of Heart Value Cavitation Based on High Fidelity Pressure Measurements," *Advances in Bioengineering 1994*, by Laura A. Garrison et al., BED–vol. 28, pp. 297–298 (Nov. 6–11, 1994).

"Monitoring and Diagnosis of Cavitation in Pumps and Values Using the Wigner Distribution," *Hydroaccoustic Facilities, Instrumentation, and Experimental Techniques*, NCA–vol. 10, pp. 31–36 (1991).

"Developing Predictive Models for Captivation Erosion," *Codes and Standards in a Global Environment*, PVP–vol. 259, pp. 189–192 (1993).

"Self–Diagnosing Intelligent Motors: A Key Enabler for Next Generation Manufacturing System," by Fred M. Discenzo et al., pp. 3/1–3/4 (1999).

\* cited by examiner

SPECTRAL DIAGNOSTICS IN A MAGNETIC FLOW METER

REFERENCE TO CO-PENDING APPLICATION

This application is a continuation-in-part of application Ser. No. 09/209,134, filed Dec. 10, 1998 and titled "ADJUSTABLE BANDWIDTH FILTER FOR PROCESS VARIABLE TRANSMITTER."

BACKGROUND OF THE INVENTION

The present invention relates to magnetic flow meters that sense liquids flowing in industrial process plants. In particular, the present invention relates to noise detected by electrode circuits in such magnetic flow meters.

Magnetic flow meters utilize an insulated flowtube that carries liquid flowing past an electromagnet and electrodes. The electrodes are sealed in the flowtube and make contact with the flowing liquid. The electrodes sense an electromotive force (EMF) magnetically induced in the liquid, and proportional to flow rate according to Faraday's law of electromagnetic induction.

Along with this flow EMF, undesired noise is often received from the electrodes of a magnetic flow tube. This electrical noise is indicative of undesired operating conditions associated with the flowing liquid such as poor liquid grounding connections, excessive electrical resistivity in the flowing liquid, particles in the liquid impacting the electrodes, ongoing dissolving of particles in the liquid, ongoing chemical reactions in the liquid, entrained gas bubbles and the like.

This "electrode noise," that originates in the liquid, can give rise to measurement instability or variability in the flow output of the transmitter that can go undiagnosed by the operator of the process plant for long periods of time.

SUMMARY OF THE INVENTION

A magnetic flow transmitter with noise diagnostics and a method of noise diagnostics are disclosed. The transmitter includes a digital processor that generates spectral components of a digitized, amplified electrode signal from a flow tube carrying a flow of a liquid. These spectral components extend over a fundamental frequency that is selected for a coil driver output provided to the flow tube and also extend over a frequency of at least one known potential noise source. The digital processor generates a diagnostic output as a function of at least one spectral component at or near the frequency of the noise source. The digital processor also generates a flow output as a function of at least one spectral component at or near the fundamental.

The diagnostic output indicates the frequency and amplitude of noise detected from the fluid and whether the noise is large enough to affect the stability of the flow output so that corrective action can be taken if needed.

DETAILED DESCRIPTION OF THE ILLUSTRATED EMBODIMENTS

A magnetic flow transmitter is disclosed in which a digital processor with diagnostics detects undesired noise received from an electrode circuit of a magnetic flow tube. The electrical noise is indicative of undesired operating conditions associated with the flowing liquid such as poor liquid grounding connections, excessive electrical resistivity in the flowing liquid, particles in the liquid impacting the electrodes, ongoing dissolving of particles in the liquid, or ongoing chemical reactions in the liquid, entrained gas bubbles and the like.

The noise, when it is large enough, can reduce the stability of the flow output of the magnetic flow transmitter, The disclosed transmitter includes a digital processor that generates spectral components of a digitized, amplified electrode signal from a flow tube carrying a flow of a liquid. The spectral components extend over a fundamental frequency selected for use in a coil driver output provided to the flow tube, and also extend over a frequency of at least one potential noise source.

The digital processor generates a diagnostic output as a function of at least one spectral component at or near the frequency of the noise source. The digital processor also generates a flow output as a function of at least one spectral component at or near the fundamental.

The diagnostic output indicates whether the stability of the flow output is affected by the noise so that corrective action can be taken.

Figure 1:
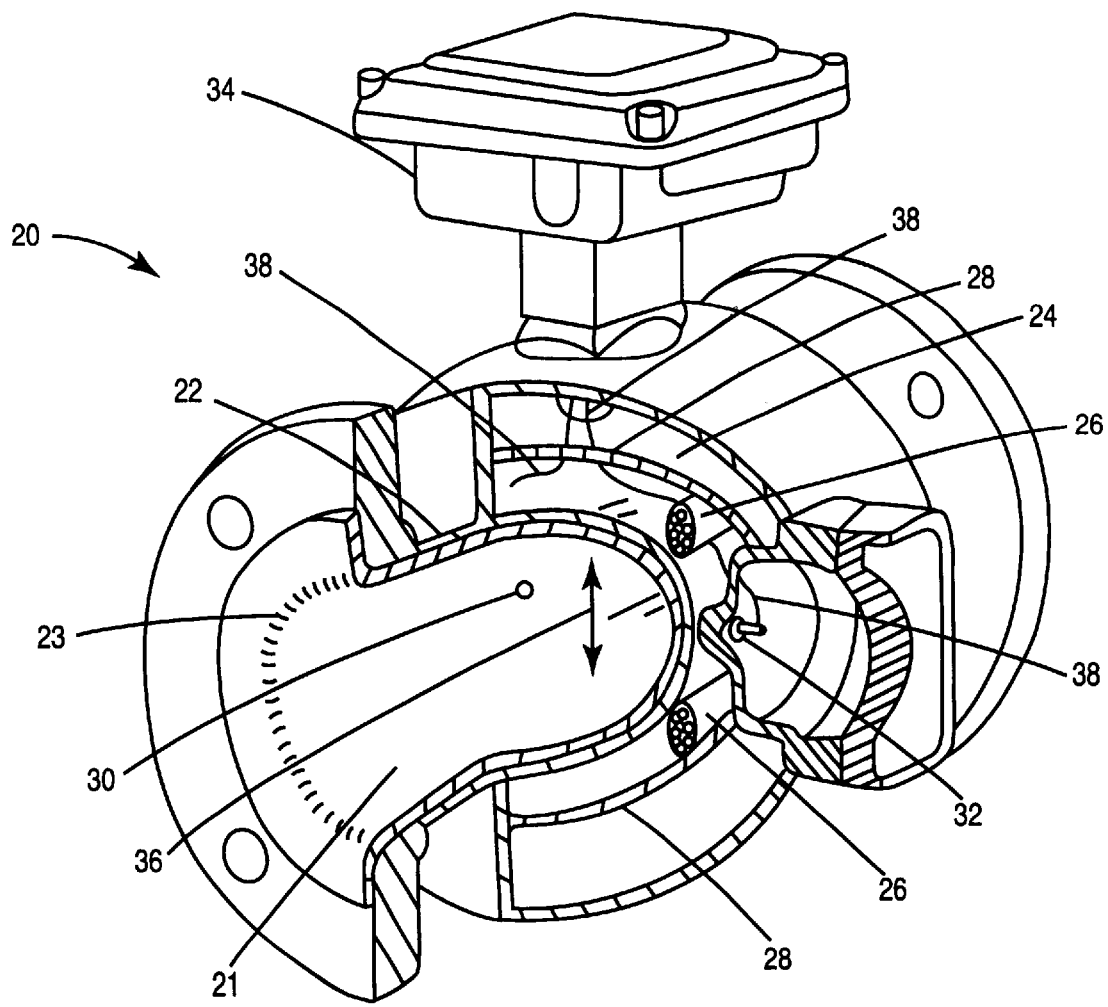
FIG. 1 illustrates a magnetic flow tube and a magnetic flow transmitter.

In FIG. 1, a partially cutaway view of an embodiment of a magnetic flow meter 20 is illustrated. Magnetic flow meter 20 includes a flowtube 22 formed of low magnetic permeability material with an electrically insulating liner 23, an electromagnet 24 with coils 26, a ferromagnetic core or shield 28, and electrodes 30, 32. The electromagnet 24 and the electrodes 30, 32 are wired to a transmitter circuit 34. In operation, the transmitter circuit 34 drives the electromagnet 24 with an electrical current, and the electromagnet 24 produces a magnetic field 36 illustrated with arrows inside the flowtube 22. Process liquid 21 fills the flowtube 22 and flows through the magnetic field in the flowtube 22. The flow induces an electromotive force (EMF, voltage) in the liquid 21. The insulating liner 23 prevents leakage of the EMF from the liquid 21 to the metal flowtube 22. The electrodes 30, 32 contact the liquid 21 and pick up or sense the EMF which, according to Faraday's law, is proportional to the flow rate of the liquid 21 in the flow tube 22.

The EMF from electrodes 30, 32 is carried to the transmitter circuit 34 by leads 38 that are insulated to avoid leakage. The transmitter circuit 34 has an electrode input circuit with high input impedance to limit leakage as well.

The electrodes 30, 32 are well isolated from sources of noise and leakage originating outside the flowtube 22, however the electrodes 30, 32 are exposed to contact with the liquid 21 passing through the flow tube 22, and are thus susceptible to electrical noise that is present in, or conducted by the liquid 21 itself. The electrical noise is indicative of undesired operating conditions associated with the flowing liquid such as poor liquid grounding, excessive electrical resistivity in the flowing liquid, particles in the fluid impacting the electrodes, ongoing dissolving of particles in the liquid, or ongoing chemical reactions in the liquid, entrained gas bubbles and the like.

Figure 2:
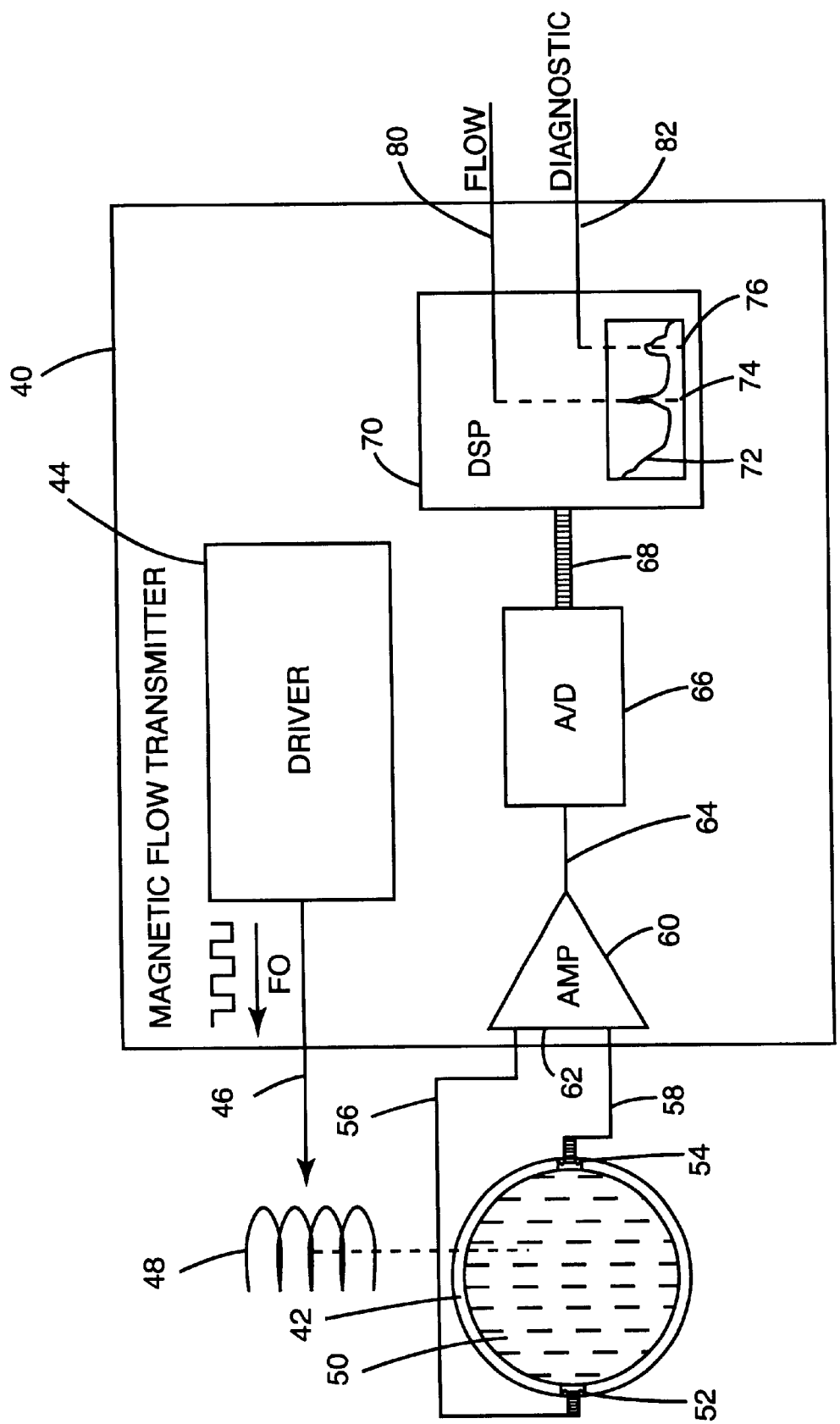
FIG. 2 illustrates a block diagram of a first embodiment of a magnetic flow transmitter with diagnostics.

In FIG. 2, a schematic block diagram of a first embodiment of a magnetic flow transmitter 40 is illustrated connected to a magnetic flow tube 42. The magnetic flow transmitter 40 includes a driver 44 that provides a driver output 46 at a selected fundamental "Fo," also called the first harmonic or the lowest frequency component of a complex wave. The magnetic flow tube 42 has an electromagnet or coil 48 that is driven either directly or indirectly by the driver output 46. Typically, driver 44 provides a one ampere, approximately square wave, current to the coil 48. Electric current in coil 48 produces a magnetic field in flowing liquid 50 in the flow tube 42. An electromotive force (EMF or voltage) proportional to flow velocity is induced by the interaction of the magnetic field and the flow of the liquid 50 according to Faraday's Law. Electrodes 52, 54 pick up or sense this EMF. Electrodes 52, 54 are coupled to amplifier 60 by leads 56, 58.

The amplifier 60 has an amplifier input 62 that couples to the electrodes 52, 54 on the flow tube 42 and has an amplifier output 64. Typically, amplifier input 62 includes high impedance unity gain amplifiers or buffers to avoid excessive leakage currents from the electrodes 52, 54. As one skilled in the art would appreciate, the amplifier output 64 typically has a single ended output that is referenced to a circuit common or ground. Amplifier 60 thus typically performs a differential-to-single ended conversion function.

An analog-to-digital converter 66 receives the amplifier output 64 and generates a digital output 68, that is a series of digital words that are proportional to the amplifier output 64.

A digital processor 70 receives the digital output 68 and generates spectral components 72 of the digital output 68 that extend over both the fundamental 74 and a frequency 76 of a known potential noise source. The known potential noise source can be any noise originating in, or conducted by the liquid 50 in the flow tube as discussed above.

The processor 70 generates a flow output 80 as a function of at least one spectral component at or near the fundamental 74. Preferably the processor 70 and the driver 44 are controlled by the same clock, and then the flow output is represented by one spectral component exactly at the fundamental 74. The processor 70 further generates a diagnostic output 82 as a function of at least one spectral component at or near the frequency 76 of the noise source. The flow output 80 and the diagnostic output 82 are preferably galvanically isolated from the electrodes 52, 54. This galvanic isolation can be integrated into the transmitter 40 in several different ways. Amplifier 60 can be a isolation amplifier, the digital output 68 can be coupled through an optical isolator, or the output 80, 82 can be coupled through optical isolators, for examples.

The processor 70, in one preferred embodiment, comprises a digital signal processor (DSP). The operation of the digital signal processor is preferably synchronized with the sampling done in A/D converter 66 so that delay time and response time of the transmitter are shorter. In another preferred embodiment, the processor 70 comprises a microprocessor that also performs other control and computing functions in transmitter 40. The use of a microprocessor system is advantageous because it allows detailed integration of the digital signal processing with other transmitter functions in a software program stored in memory in the microprocessor system. In yet another embodiment, the processor includes digital bandpass filters with center frequencies corresponding with the flow signal frequency and also frequencies selected to provide a smaller number of spectral representations at known noise or interference frequencies.

The processor 70 preferably generates the spectral components 72 in the frequency domain as a transform function of 1024 byte blocks of 24 bit digital data in the time domain data at the digital output 68. Larger blocks of memory, such as 2048 or 4096 byte blocks can be used to get narrower resolution in each data bin, improve accuracy of the noise measurement and reduce "leakage" of the flow signal into nearby bins, especially when noise is at frequencies of less than 100 Hz. The transform function is preferably a Fourier type transform, such as a fast Fourier transform (FFT) or a discrete Fourier transform (DFT). The time domain data at the digital output that is processed by the transform is substantially a rectangular wave or square wave with noise superimposed on the wave. The wave has substantially the same shape and fundamental Fo as the wave provided by driver 44.

The processor 70 also preferably generates spectral components 72 that are synchronized with the driver output 46. Processor 70 can be synchronized with driver 44 by use of the rectangular or square wave components present at digital output 68 and a phase locked loop. Synchronization can also be achieved by clocking both the processor 70 and the driver 44 from a common clock. Preferably, however, the processor controls the driver as explained in more detail below in connection with FIG. 3.

Figure 3:
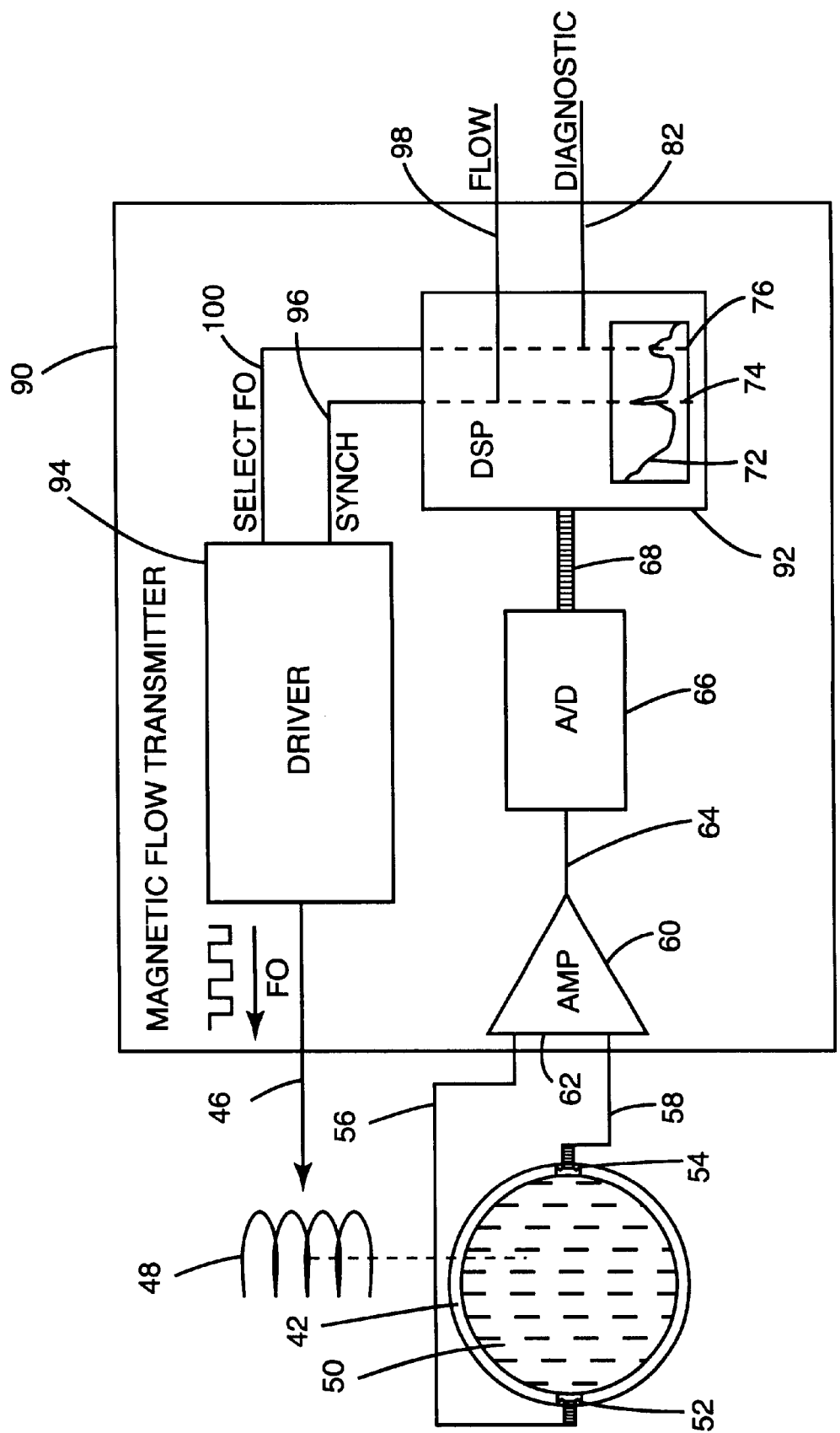
FIG. 3 illustrates a block diagram of a second embodiment of a magnetic flow transmitter with diagnostics.

In FIG. 3, another embodiment of magnetic flow transmitter 90 is illustrated in which a digital processor 92 is synchronized with a driver 94 using a synchronization line 96. The embodiment shown in FIG. 3 is similar to the embodiment shown in FIG. 2 and the same reference numerals used in FIG. 3 as are used in FIG. 2 to identify the same or similar features. The synchronization line 96 synchronizes the operation of driver 94 under control of the digital processor 92 so that the substantially rectangular flow signal is processed in a synchronous manner with the correct phase. The processor 92 controls the driver 94 via line 96 to provide the desired synchronization.

When noise is of a high enough level to affect the stability of the flow output 98, the processor 92 can select, change or control the fundamental Fo via select line 100 coupled between driver 94 and processor 92. By changing the fundamental Fo, the processor 92 can move the flow signal in the frequency domain to avoid the detected noise and thus restore the stability of the flow transmitter output automatically. To improve stability when high noise levels are detected, the processor 92 can also select, change or control signal processing functions such as damping of the output signal, or select known noise rejection software routines for use by the processor 92. Noise rejection software techniques can be used to effectively increase the averaging time of the noise signals to improve stability. Algorithms resident in the noise rejection software routines differentiate noise from changes in the process variable to allow rapid response to those changes. Signal processing techniques can also be selected from those described in the above cited pending application Ser. No. 09/209,134. The algorithms used in the software routines can include neural networks, wavelet signal processing and other known filtering techniques.

Figure 4:
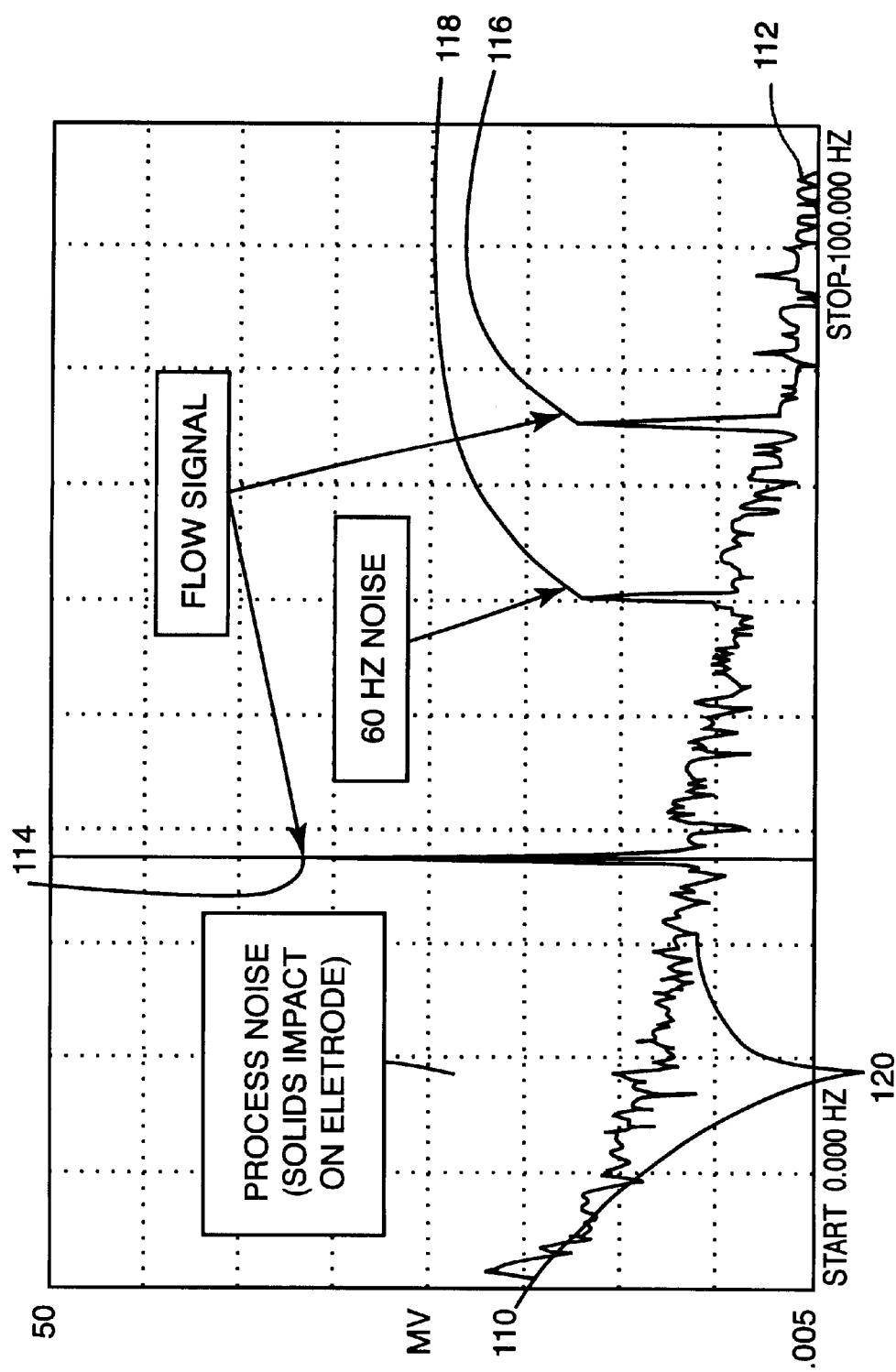
FIG. 4 illustrates a sampled waveform of spectral components of an amplified, digitized electrode signal including a flow signal and noise signals at multiple frequencies.

In FIG. 4, spectral components of an amplified, digitized electrode signal including a flow signal and noise signals at multiple frequencies are displayed in an output image of a spectral analyzer. A spectrum extending from frequencies near zero frequency at 110 up to 100 Hertz at 112 is displayed. The fundamental Fo of the drive and the flow signal is at approximately 37.5 Hertz at 114 and a second harmonic of the flow signal at approximately 75 Hertz is displayed at 116. Noise from the 60 Hertz power line appears in the liquid in the flow tube as displayed at 118. Noise from particle impact on electrodes, chemical reaction noise and the like appears as so-called "red noise", "pink noise," or "1/F noise" at 120.

In digitally processing the data shown in FIG. 4, various known spectral averaging, "focussing," and regression techniques can be used to combine a larger series of spectral data points into a smaller series of averages of small groups of adjacent data points to achieve higher repeatability and stability. The flow signal, for example can be a numerical regression of several data points around the fundamental Fo. These alternate averaging or regression techniques are especially useful in situations where the processor is not precisely synchronized with the driver, or where the processor generates more spectral data at finer spectral increments than is actually needed for calculating flow rates. Spectral data points can also be distributed in non-uniform increments for specialized noise problems, especially when noise is at less than 100 Hz.

Figure 5:
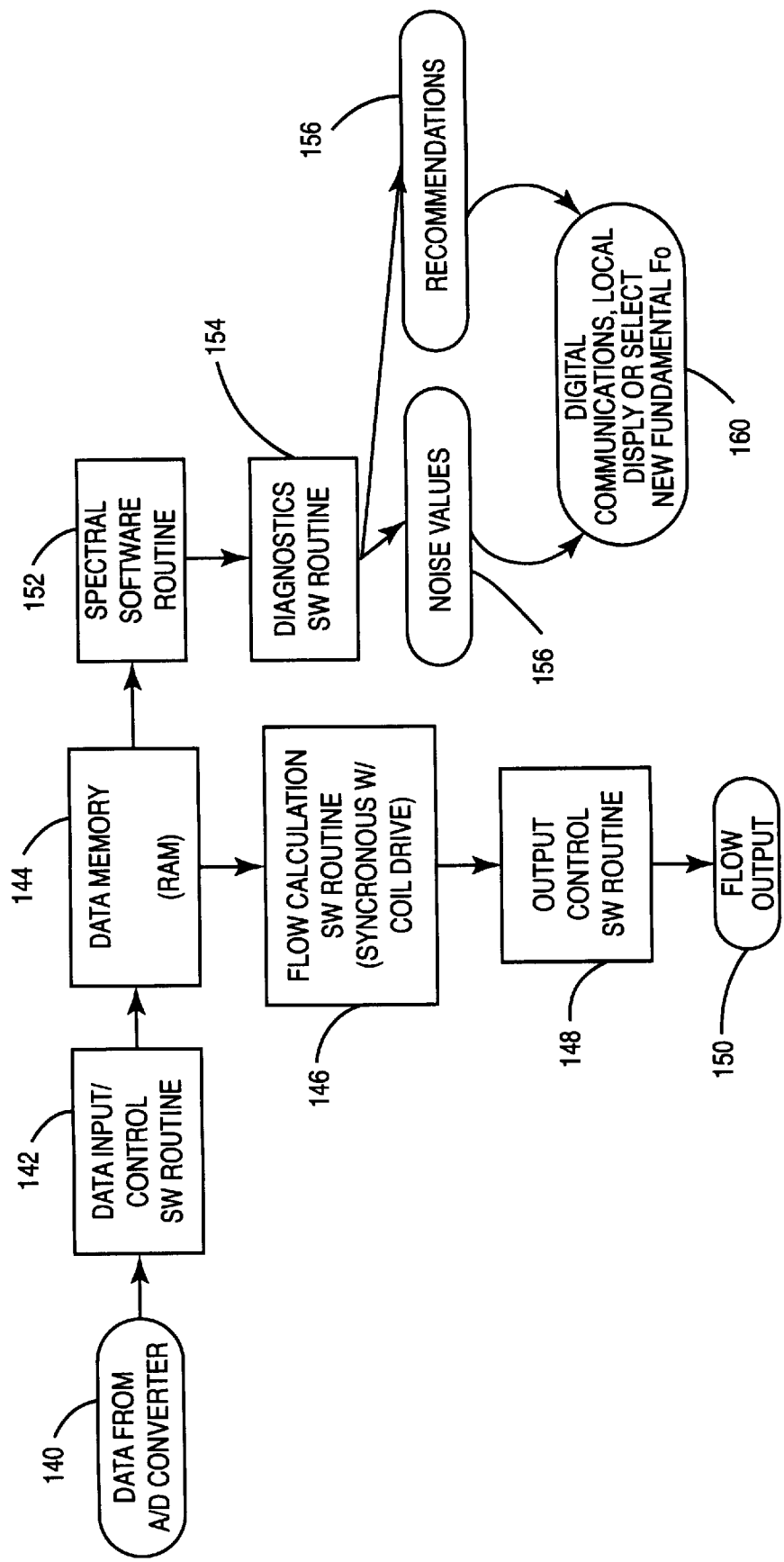
FIG. 5 illustrates a flow chart of a first diagnostic process.

In FIG. 5, a diagnostic method is illustrated in more detail. In using the method shown in FIG. 5 in a magnetic flow meter, a coil on a flow tube carrying a flow of a liquid is driven with a substantially rectangular wave at a repetition frequency or selected fundamental Fo. A signal from electrodes on the flow tube is amplified to provide an amplifier output. The amplifier output is converted to a digital output in an A/D converter. The digital output from the A/D converter is taken at 140 in FIG. 5 and used as data input to a software routine 142 that can also control the A/D converter. A block of data from the digital output is stored in RAM at 144. The processor uses a portion of the block of data stored in RAM at 144 in a software routine that calculates flow rate by evaluating the data in synchronization with the coil drive as illustrated at 146. The results of the calculations at 146 are passed to an output software control routine 148 which controls the flow output 150.

A portion of the block of data stored at 144 is also passed to a spectral software routine 152 that calculates the spectral distribution of electrode noise. The noise values are diagnosed in a software routine at 154 and noise values are output at 156. The diagnostic software routine 154 also generates text strings of recommendations for corrective action at 158. The noise values at 156 and the text strings at 158 are diagnostic outputs 160 that are passed to digital communication or transmission to a remote location, display on a liquid crystal display that is located in the transmitter or used to select a different fundamental frequency Fo to avoid the noise.

Figure 6:
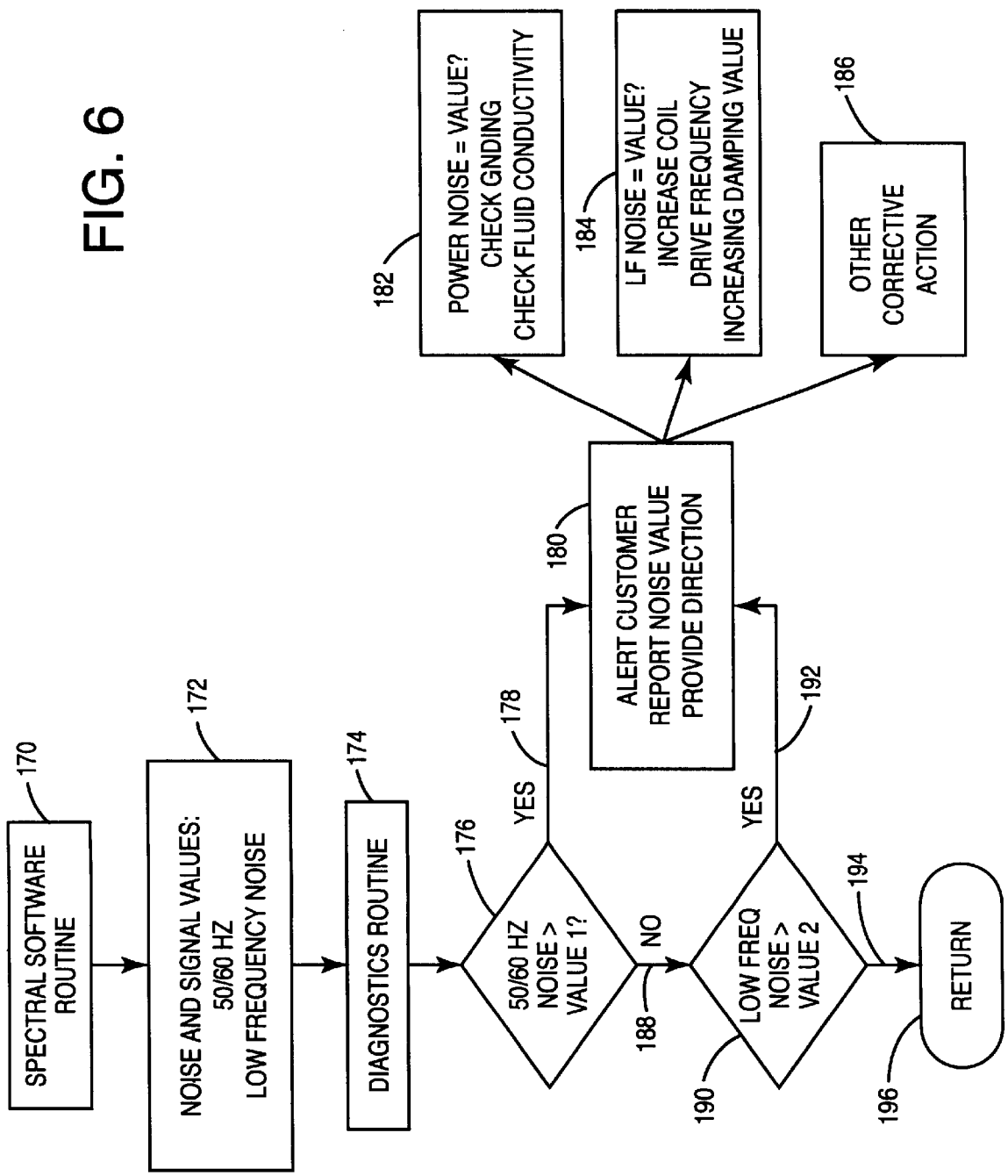
FIG. 6 illustrates a flow chart of a second diagnostic process.

In FIG. 6, an alternate diagnostic method or software routine is illustrated. The software routine starts at 170. Data from the digital output of the A/D converter is stored in RAM at 172 and a diagnostic routine is performed on the data at 174. The diagnostic routine at 174 performs a Fourier type transform on the time domain data and generates a frequency domain representation as spectral values that extend over the fundamental frequency and known interfering noise frequencies. Next, the spectral values are compared to stored reference values to ascertain if 60 Hertz noise is high enough to cause instability at 176. If the 60 Hertz noise is too high, the routine branches at 178 to routine 180 to transmit an alert and noise values to the customer at 182 at a remote location, display the noise value and the alert on a local display and provide text strings suggesting corrective action and control the fundamental Fo to a different value to avoid noise as illustrated at 184 or take other corrective action as illustrated at 186.

If 60 Hertz noise is not detected, then program flow branches at 188 to compare stored spectral values to reference levels stored in memory at 190. If low frequency (1/F) noise is too high, then the program flow branches at 192 to perform corrective actions described above. If low frequency noise is not too high, then program flow branches at 194 to return to the main program flow at 196.

The various methods, software routines and instructions can be stored on a computer readable medium such as a hard disc, a removable disc, a CDROM or other media for downloading or uploading to memory in the magnetic flowmeter.

Although the present invention has been described with reference to preferred embodiments, workers skilled in the art will recognize that changes may be made in form and detail without departing from the spirit and scope of the invention.

What is claimed is:

1. A magnetic flow transmitter, comprising:
   a driver adapted to provide a driver output at a selected fundamental to a coil on a flow tube carrying a flow of a liquid;
   an amplifier having an amplifier input adapted to couple to electrodes on the flow tube, the amplifier having an amplifier output;
   an analog-to-digital converter having a digital output related to the amplifier output; and
   a digital processor that receives the digital output and generates spectral components of the digital output that extend over both the fundamental and a frequency of a known potential noise source different than the fundamental; the processor providing a flow output as a function of at least one spectral component at or near the fundamental, the processor further providing a diagnostic output as a function of at least one spectral component at or near the frequency of the noise source.

2. The magnetic flow transmitter of claim 1 wherein the processor comprises a digital signal processor.

3. The magnetic flow transmitter of claim 1 wherein the processor comprises a microprocessor.

4. The magnetic flow transmitter of claim 1 wherein the processor generates the spectral components in the frequency domain as a transform function of time domain data at the digital output.

5. The magnetic flow transmitter of claim 4 wherein the transform function is a Fourier type transform.

6. The magnetic flow transmitter of claim 5 wherein the Fourier type transform is a fast Fourier transform.

7. The magnetic flow transmitter of claim 5 wherein the Fourier type transform function is a discrete Fourier transform.

8. The magnetic flow transmitter of claim 1 wherein the driver output is substantially a rectangular wave with a fundamental Fo.

9. The magnetic flow transmitter of claim 8 wherein the spectral components are generated in synchronization with the driver output.

10. The magnetic flow transmitter of claim 9 further comprising a synchronization line coupled between the driver and the processor.

11. The magnetic flowmeter of claim 1 further comprising a control line coupled from the processor to the driver, the line controlling the fundamental.

12. The magnetic flow transmitter of claim 1 wherein the flow and diagnostic outputs are galvanically isolated from the amplifier input.

13. The magnetic flow transmitter of claim 1 wherein the digital processor comprises digital filters controlled as a function of the diagnostic output.

14. A method of operation of magnetic flow transmitter, the method comprising:

driving a coil on a flow tube carrying a flow of a liquid, the driving having a repetition frequency at a selected fundamental Fo;

amplifying a signal from electrodes on the flow tube to provide an amplifier output;

converting the amplifier output to a digital output;

digitally processing the digital output to generate spectral components of the digital output that extend over both the fundamental and a frequency of a known potential noise source that is different than Fo;

generating a flow output as a function of at least one spectral component at or near the fundamental; and generating a diagnostic output as a function of at least one spectral component at or near the frequency of the noise source.

15. The method of claim 14 further comprising:

selecting the fundamental Fo as a function of the diagnostic output.

16. The method of claim 14 further comprising:

adjusting the digital processing as a function of the diagnostic output.

17. The method of claim 14 further comprising:

communicating the diagnostic output to a location remote from the magnetic flow transmitter.

18. The method of claim 14 further comprising:

displaying the diagnostic output on a display on the magnetic flow transmitter.

19. A magnetic flow transmitter, comprising:

a driver adapted to provide a driver output at a selected fundamental to a coil on a flow tube carrying a flow of a liquid;

an amplifier having an amplifier input adapted to couple to electrodes on the flow tube, the amplifier having an amplifier output;

an analog-to-digital converter receiving the amplifier output and generating a digital output; and processor means receiving the digital output and digitally generating spectral components of the digital output extending over both the fundamental and a frequency of a known potential noise source that is different than the selected fundamental; the processor means generating a flow output as a function of at least one spectral component at or near the fundamental, and the processor means further generating a diagnostic output as a function of at least one spectral component at or near the frequency of the noise source.

20. A computer readable medium having stored thereon a plurality of sequences of instructions, the plurality of sequences of instructions including sequences which, when executed by a processor in a magnetic flow transmitter, cause the processor to perform the sequence:

receiving digital output representing a time domain amplified flow signal obtained from electrodes on a magnetic flow tube;

digitally generating spectral components of the digital output extending over both a fundamental of a coil drive on the flow tube and a frequency of a known potential noise source that is different than the fundamental;

generating a flow output as a function of at least one spectral component at or near the fundamental; and generating a diagnostic output as a function of at least one spectral component at or near the frequency of the noise source.

* * * * *

UNITED STATES PATENT AND TRADEMARK OFFICE
CERTIFICATE OF CORRECTION

PATENT NO. : 6,615,149 B1
DATED : September 2, 2003
INVENTOR(S) : David L. Wehrs It is certified that error appears in the above-identified patent and that said Letters Patent is hereby corrected as shown below:

Title page,
Item [56], References Cited, U.S. PATENT DOCUMENTS,
"5,408,406, Skeirik" should be -- 5,408,406, Mathur et al. --
"5,408,586, Mathur et al." should be -- 5,408,586, Skeirik --

Signed and Sealed this

Tenth Day of August, 2004

JON W. DUDAS
*Acting Director of the United States Patent and Trademark Office*